US012365811B2

(12) United States Patent
Utterodt et al.

(10) Patent No.: US 12,365,811 B2
(45) Date of Patent: Jul. 22, 2025

(54) POLYMERIZABLE COMPOSITION

(71) Applicant: KULZER GMBH, Hanau (DE)

(72) Inventors: Andreas Utterodt, Neu-Anspach (DE); Christoph Meier, Bruchkoebel (DE); Nelli Schoenhof, Braunfels (DE); Jutta Schneider, Runkel (DE); Kurt Reischl, Merenberg (DE); Raif Kocoglu, Graevenwiesbach (DE); Michael Eck, Schmitten (DE)

(73) Assignee: KULZER GMBH, Hanau (DE)

( * ) Notice: Subject to any disclaimer, the term of this patent is extended or adjusted under 35 U.S.C. 154(b) by 113 days.

(21) Appl. No.: 17/773,361

(22) PCT Filed: Oct. 29, 2020

(86) PCT No.: PCT/EP2020/080376
§ 371 (c)(1),
(2) Date: Apr. 29, 2022

(87) PCT Pub. No.: WO2021/083995
PCT Pub. Date: May 6, 2021

(65) Prior Publication Data
US 2024/0182744 A1 Jun. 6, 2024
US 2024/0352274 A2 Oct. 24, 2024

(30) Foreign Application Priority Data
Oct. 31, 2019 (DE) .................... 10 2019 129 551.3

(51) Int. Cl.
| *C08F 2/46* | (2006.01) |
| *B33Y 70/10* | (2020.01) |
| *C08F 2/50* | (2006.01) |
| *C08F 222/22* | (2006.01) |
| *C08G 61/04* | (2006.01) |
| *C08K 13/06* | (2006.01) |
| *C09D 4/00* | (2006.01) |
| *C09D 7/48* | (2018.01) |
| *C09D 7/62* | (2018.01) |
| *C09D 7/63* | (2018.01) |
| *C09D 135/02* | (2006.01) |
| *B29C 64/135* | (2017.01) |
| *B29K 33/04* | (2006.01) |
| *B29K 105/00* | (2006.01) |
| *B29K 509/00* | (2006.01) |
| *B33Y 10/00* | (2015.01) |
| *C08K 3/16* | (2006.01) |
| *C08K 3/22* | (2006.01) |
| *C08K 3/36* | (2006.01) |
| *C08K 3/40* | (2006.01) |
| *C08K 5/132* | (2006.01) |
| *C08K 9/04* | (2006.01) |

(52) U.S. Cl.
CPC ............ *C09D 135/02* (2013.01); *B33Y 70/10* (2020.01); *C08F 222/22* (2013.01); *C08K 13/06* (2013.01); *C09D 4/00* (2013.01); *C09D 7/48* (2018.01); *C09D 7/62* (2018.01); *C09D 7/63* (2018.01); *B29C 64/135* (2017.08); *B29K 2033/04* (2013.01); *B29K 2105/0002* (2013.01); *B29K 2509/00* (2013.01); *B33Y 10/00* (2014.12); *C08F 2800/20* (2013.01); *C08K 3/16* (2013.01); *C08K 2003/2241* (2013.01); *C08K 3/36* (2013.01); *C08K 3/40* (2013.01); *C08K 5/132* (2013.01); *C08K 9/04* (2013.01); *C08K 2201/005* (2013.01); *C08K 2201/011* (2013.01); *C08K 2201/014* (2013.01)

(58) Field of Classification Search
CPC ............... C08F 2/46; C08F 2/50; C08G 61/04
USPC ................. 522/79, 71, 1, 189, 184, 6; 520/1
See application file for complete search history.

(56) References Cited

U.S. PATENT DOCUMENTS

| 4,744,827 | A | * | 5/1988 | Winkel | .................... C08F 20/36 106/35 |
| 11,273,018 | B2 | | 3/2022 | Boehm et al. | |
| 2010/0076115 | A1 | | 3/2010 | Utterodt et al. | |
| 2012/0083550 | A1 | * | 4/2012 | Blomker | ................ A61K 6/836 977/773 |
| 2020/0253836 | A1 | | 8/2020 | Utterodt et al. | |

FOREIGN PATENT DOCUMENTS

| WO | 2018/042001 A1 | 3/2018 |
| WO | 2019/068615 A1 | 4/2019 |

OTHER PUBLICATIONS

Dayane Carvalho Ramos Salles De Oliveira et al. "Effect of Low Shrinkage Monomers on Physicochemical Properties of Dental Resin Composites", Brazilian Dental Journal, vol. 26, No. 3, Jun. 1, 2015 (Jun. 1, 2015), pp. 272-276.

* cited by examiner

*Primary Examiner* — Jessica Whiteley
(74) *Attorney, Agent, or Firm* — Norris McLaughlin, PA

(57) ABSTRACT

The invention relates to a polymerisable composition comprising
(i) 0 to 90% by weight of at least one inorganic filler component,
(ii) 5 to 99.98% by weight of at least one urethane (alkyl) acrylate of the idealised formula I,
(iii) 0.01 to 25% by weight of at least one di-, tri-, tetra-or multi-functional monomer, not being a urethane (alkyl) acrylate,
(iv) 0.01 to 10% by weight of at least one initiator, of an initiator system as well as optionally of at least one stabiliser and optionally of at least one pigment, the total composition of the composition amounting to 100% by weight, as well as a polymerised composition having improved fracture toughness.

12 Claims, 1 Drawing Sheet

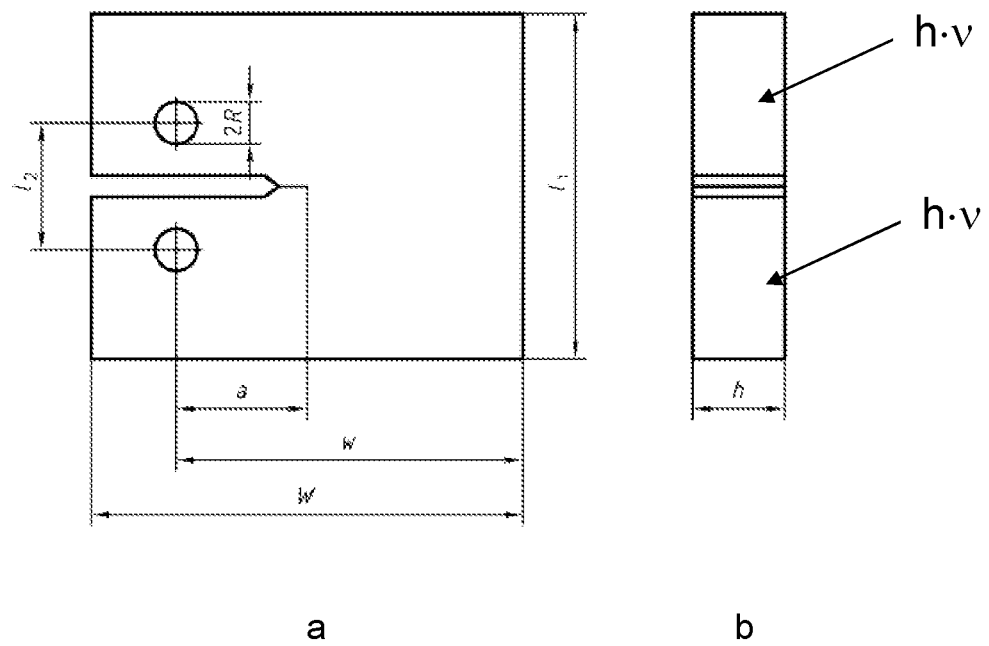

POLYMERIZABLE COMPOSITION

This application is a 371 of International Patent Application No. PCT/EP2020/080376, filed Oct. 29, 2020, which claims priority of German Patent Application No. 10 2019 129 551.3, filed Oct. 31, 2019, the disclosures of which patent applications are hereby incorporated herein by reference.

The invention relates to a polymerisable composition comprising
(i) 0 to 90% by weight of at least one inorganic filler component,
(ii) 5 to 99.98% by weight of at least one urethane (alkyl) acrylate of the idealised formula I,
(iii) 0.01 to 25% by weigh of at least one di-, tri-, tetra- or multi-functional monomer not being a urethane (alkyl) acrylate,
(iv) 0.01 to 10% by weight of at least one initiator, of an initiator system, as well as optionally of at least one stabiliser, and optionally of at least one pigment, the total composition of the composition amounting to 100% by weight, as well as to a polymerised composition having improved fracture toughness and preferably high flexural strength and optionally low shrinkage when producing large three-dimensional articles or objects of greater than 5 cm in at least one of the three dimensions, respectively.

It was the object of the invention to provide a polymerisable composition being suitable for producing three-dimensional articles obtainable in generative processes, in particular for use in stereolithography, DLP-methods or multijet methods (MJM) or polyjet methods. Additionally, the composition shall be suitable for producing large blocks of material, in particular of geometric moulded bodies such as milling blocks, or large three-dimensional generatively obtainable moulded bodies or articles. Additionally, the polymerisable composition shall have good values for fracture toughness representing a measure for the force to be applied for crack propagation in a material. In addition, it was the object to provide a composition having a homogeneous, monochrome colouring before and after polymerisation. In this context, not only when producing small articles but also homogeneous, monochrome colouring should be feasible with larger articles. Furthermore, polychrome, i.e. multi-coloured blocks of material with a defined colouring should be producible in casting processes or in generative processes. Moreover, a composition should be provided that is slightly flowable in non-polymerised state and has yet excellent mechanical properties in polymerised state by means of UV radiation or Vis radiation. A composition having a low shrinkage in the polymerised state, even when producing larger blocks of material, should be provided also.

Based on the state-of-the-art, a new composition with a new urethane derivative having a tricycle was developed. The invention relates to a composition as disclosed herein, to a polymerised composition as disclosed herein, as well as to the use as disclosed herein. Preferred embodiments are explained in detail in the description.

The particle size distribution can be rather wide for a high filling material packaging density and excellent mechanical properties or rather tight for specific applications, depending on the filler content aspired to.

Compositions having reduced shrinkage and good flexural strength of TCD esters are known. Surprisingly, very good values for fracture toughness (measured according to ISO 13586:2000) could be shown for radiation-cured compositions comprising polymerisation products of urethanes of the idealised formula I, in particular of the idealised formula Ia, preferably after radiation curing.

A subject matter of the invention is a polymerisable composition, comprising
(i) 0 to 90% by weight of at least one inorganic filler component,
(ii) 5 to 99.98% by weight comprising at least one urethane acrylate, the urethane acrylate comprising at least one urethane acrylate having a bivalent alicyclic group of the idealised formula I

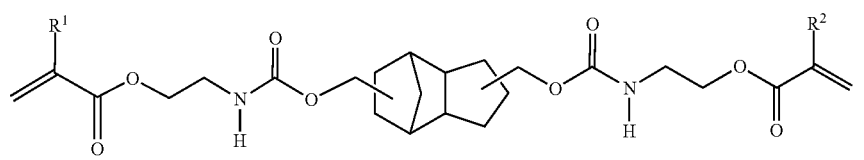

and/or mixtures of said urethanes of formula I, as well as optionally mixtures of the isomers of the afore-mentioned compounds with $R^1$ and $R^2$ each independently selected from H and alkyl with 1 to 8 C atoms,
(iii) 0.01 to 25% by weight of at least one di-, tri-, tetra- or multi-functional monomer not being a urethane acrylate or not being a urethane (alkyl) acrylate,
(iv) 0.01 to 10% by weight of at least one initiator, of an initiator system, as well as optionally of at least one stabiliser, and optionally of at least one pigment, the total composition of the composite material amounting to 100% by weight.

In doing so, (ii) preferably comprises a mixture of at least two, preferably three different urethane acrylates. Particularly preferably, (ii) in combination with (iii) is selected from a di-, tri-, tetra- or multi-functional methacrylic ester of polyethers, preferably dimethacrylate triethylene glycol, dimethacrylate tetraethylene glycol, and/or bis-(2'-oxa-3'-oxo-pentyl-4'-ene) tetrahydrodicyclopentadiene and isomers thereof.

A preferred composition comprises
(i) 5 to 90% by weight of an inorganic filler component comprising at least one glass, one crystalline silicate, such as quartz, feldspar, metal oxide, such as crystalline and/or amorphous metal oxides, mixed oxide, such as crystalline or amorphous mixed oxides, silicon dioxide, zirconium dioxide, zinc oxide and/or mixture of at least two of the said components, the components having an average particle size of 0.2 μm to 10 μm, as well as optionally at least one amorphous metal oxide having an average primary particle size of 10 nm to 115 nm, in particular having a primary particle size of 2 nm to 100 nm, particularly preferably of 2 to 45 nm, as well as
(ii) 5 to 85% by weight, in particular 10 to 85% by weight, of the at least one urethane acrylate or of a mixture of urethane acrylates,
(iii) 0.01 to 25% by weight of at least one di-, tri-, tetra- or multi-functional monomer not being a urethane acrylate and/or not being a urethane alkyl acrylate, (iv) 0.01 to 10% by weight of at least one initiator, of an initiator system, as well as optionally of at least one stabiliser, and optionally of at least one pigment, the total composition of the composition amounting to 100% by weight.

A further preferred composition comprises
(i) 40 to 90% by weight of an inorganic filler component comprising at least one glass, silicate, quartz, feldspar, metal oxide, mixed oxide, silicon dioxide, zirconium dioxide and/or zinc oxide having an average particle size of 0.4 μm to 10 μm, as well as optionally at least one amorphous metal oxide having an average primary particle size of 10 nm to 115 nm, as well as
(ii) 5 to 60% by weight, in particular 5 to 30% by weight, alternatively preferably 10 to 60% by weight, comprising at least one urethane acrylate, the urethane acrylate comprising at least one urethane acrylate having a bivalent alicyclic group of the idealised formula I,

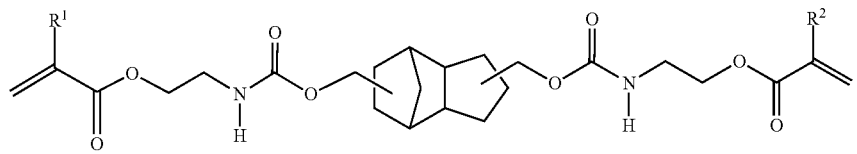

and/or mixtures of said urethanes of formula I, as well as optionally mixtures of the isomers of the afore-mentioned compounds with $R^1$ and $R^2$ each independently selected from H and alkyl with 1 to 8 C atoms,
(iii) 0.01 to 15% by weight of at least one di-, tri-, tetra- or multi-functional monomer not being a urethane acrylate or not being a urethane (alkyl) acrylate,
(iv) 0.01 to 10% by weight of at least one initiator, of an initiator system, as well as optionally of at least one stabiliser, and optionally of at least one pigment, the total composition of the composite material amounting to 100% by weight.

Furthermore, a subject matter of the invention is a composition comprising
(i) 65 to 85% by weight, in particular 70 to 85% by weight, of an inorganic filler component comprising at least one glass, silicate, quartz, feldspar, metal oxide, mixed oxide, silicon dioxide, zirconium dioxide and/or zinc oxide, or mixtures of at least two of the components having an average particle size of 0.4 μm to 10 μm, preferably of 0.4 to 7.5 μm, as well as optionally at least one amorphous metal oxide having an average primary particle size of 10 nm to 115 nm, in particular of 2 to 100 nm, as well as
(ii) 10 to 35% by weight, in particular 10 to 30% by weight, comprising at least one urethane acrylate, the urethane acrylate comprising at least one urethane acrylate having a bivalent alicyclic group of the idealised formula I, and/or mixtures of said urethanes of formula I, as well as optionally mixtures of the isomers of the afore-mentioned compounds with $R^1$ and $R^2$ each independently selected from H and alkyl with 1 to 8 C atoms,
(iii) 0.01 to 5% by weight of at least one di-, tri-, tetra- or multi-functional monomer not being a urethane acrylate or not being a urethane (alkyl) acrylate,
(iv) 0.01 to 10% by weight of at least one initiator, of an initiator system, as well as optionally of at least one stabiliser, and optionally of at least one pigment, the total composition of the composite material amounting to 100% by weight.

A subject matter of the invention is a polymerisable composition, in particular a photoinitiatedly or photochemically polymerisable composition, comprising
(i) 0 to 90% by weight, in particular 0 to 35% by weight, preferably 0.5 to 35% by weight, of at least one inorganic filler component of an average particle size $d_{50}$ of 0.5 μm to 5 μm, preferably 0.7 to 3.5 μm, in particular of 0.7 μm to 3.0 μm, preferably of 0.8 μm to 2.5 μm, as well as optionally at least one amorphous metal oxide of a primary particle size of 2 to 150 nm,
(ii) 10 to 85% by weight, in particular 10 to 65% by weight, preferably 12 to 65% by weight, of at least one urethane acrylate comprising at least one urethane acrylate having a bivalent alicyclic group of the idealised formula I, preferably comprising a mixture of at least two different urethane acrylates, in particular of a mixture of at least one di-functional urethane acrylate or di-functional urethane alkyl acrylate having a bivalent alicyclic group comprising a urethane of the idealised formula I, and/or mixtures of the urethanes of formula I, as well as optionally mixtures of isomers of the urethanes of formula I (see also formular Ia), in particular mixtures of the 3,8-/3,9-/4,8-/3,10-/4,10-isomers and/or of the cis- and trans-isomers of the aforementioned compounds, with $R^1$ and $R^2$ each independently selected from H and alkyl with 1 to 8 C atoms, preferred is a mixture of at least three different urethane acrylates and/or urethane alkyl acrylates, in particular comprising di- to deca-functional urethane acrylates,
(iii) 0.01 to 25% by weight, in particular from 0.01 to 10% by weight, preferably from 0.1 to 5% by weight, at least one di-, tri-, tetra- or multi-functional monomer not being a urethane acrylate or urethane (alkyl acrylate, in particular not being a urethane (meth)acrylate, and

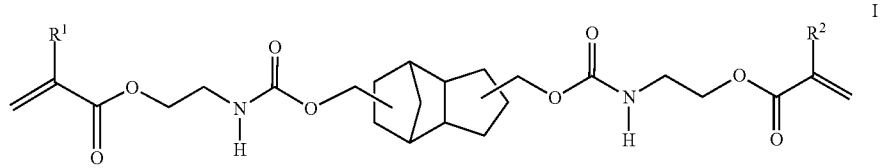

preferably being selected from a di-, tri-, tetra- or multi-functional methacrylic ester of polyethers, preferably dimethacrylate triethylene glycol, dimethacrylate tetraethylene glycol, 2,2-bis-[4-(2-hydroxy-3-methacryloyloxy-propoxy)phenyl] propane and/or bis-(2'-oxa-3'-oxo-pentyl-4'-ene) tetrahydrodicyclopentadiene and isomers thereof, (iv) 0.01 to 10% by weight of at least one initiator, of an initiator system, as well as optionally of at least one stabiliser, and optionally of at least one pigment, in particular the at least one pigment comprising fluorescence as well as colour pigments, the total composition of the composition amounting to 100% by weight.

The urethanes of the idealised formula I are carried under the cas no. 94 5656-78-0 (2-propenoic acid, 1,1'-[(octahydro-4,7-methano-1H-indene-5,?-diyl) bis(methylene oxycarbonyl amino-2,1-ethanediyl)] ester). Alternatively, the formula may be illustrated as follows.

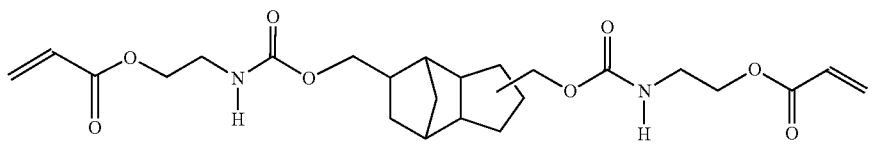

A di-functional urethane acrylate is preferably selected from di-functional urethane acrylates having a bivalent alkylene group preferably comprising di-functional urethane alkyl acrylates having a bivalent alkylene group with alkyl 1 to 10 C-atoms and alkylene 3 to 20 C atoms.

A particularly preferred composition comprises (i) 70 to 85% by weight of an inorganic filler component comprising at least one silicate, quartz, feldspar, metal oxide, mixed oxide, silicon dioxide, zirconium dioxide and/or zinc oxide, optionally a glass, or mixture of at least two of the components having an average particle size of 0.4 µm to 10 µm, in particular of 0.4 µm to 7.5 µm, as well as optionally at least one amorphous metal oxide, in particular with 0.05 to less than 10% by weight, preferably less than 4% by weight, particularly preferably from 0.05 to 2% by weight, further preferably less than 1% by weight amorphous metal oxide, based on the total composition, (ii) 10 to 30% by weight of a mixture of at least two different urethane acrylates, the mixture comprising at least one di-functional urethane acrylate and/or urethane alkyl acrylate having a bivalent alicyclic group comprising a urethane of the idealised formula I and/or mixtures of said urethanes of formula I, as well as optionally mixtures of the isomers of the afore-mentioned compounds with $R^1$ and $R^2$ each independently selected from H and alkyl with 1 to 8 C atoms, (iii) 0.01 to 5% by weight of at least one di-, tri-, tetra- or multi-functional monomer not being a urethane acrylate and/or urethane alkyl acrylate, (iv) 0.01 to 10% by weight of at least one initiator, of an initiator system, as well as optionally of at least one stabiliser, and optionally of at least one pigment, the total composition of the composition amounting to 100% by weight.

A further preferred composition comprises as (i) inorganic filler component comprising having methacrylate groups, functionalised filler component selected from silicate, quartz, feldspar, metal oxide, mixed oxide, silicon dioxide, zirconium dioxide, and/or zinc oxide, optionally a glass, or mixtures in particular of an average particle size $d_{50}$ of 0.5 µm to 10 µm, preferably 0.7 to 7.5 µm, in particular of 0.7 µm to 5.5 µm, preferably of 0.8 µm to 5.5 µm, as well as optionally at least 0.05 to 4% by weight, in particular 0.05 to 2% by weight, preferably 0.05 to 1% by weight, a non-agglomerated amorphous metal oxide, based on the total composition, preferably of a primary particle size of 2 to 150 nm, in particular of 2 to 100 nm, preferably of 2 to 45 nm, the amorphous metal oxide comprising silicon dioxide, precipitated silicon dioxide, pyrogenic silica, zirconium oxide, mixed oxides or mixture thereof, in particular the metal oxides are silanised, (ii) a mixture of at least two different urethane acrylates, in particular of a mixture of at least one di-functional urethane acrylate or di-functional urethane alkyl acrylate having a bivalent alicyclic group comprising a urethane of the idealised formula I and/or mixtures of the urethanes of formula I, as well as optionally mixtures of isomers of the urethanes of formula I (see also formula Ia), in particular mixtures of the 3,8-/3,9-/4,8-/3,10-/4,10-isomers and/or of the cis- and trans-isomers of the afore-mentioned compounds, with $R^1$ and $R^2$ each independently selected from H and alkyl with 1 to 8 C atoms, preferred is a mixture of at least three different urethane acrylates and/or urethane alkyl acrylates, in particular comprising di- to deca-functional urethane acrylates, (iii) at least one di-, tri-, tetra- or multi-functional monomer not being a urethane acrylate or urethane (alkyl) acrylate, in particular not being a urethane (methyl) acrylate, selected from multi-functional methacrylic ester of polyethers, preferably dimethacrylate triethylene glycol, dimethacrylate tetraethylene glycol, 2,2-bis-[4-(2-hydroxy-3-methacryloyloxy-propoxy)phenyl] propane and/or bis-(2'-oxa-3'-oxo-pentyl-4'-ene) tetrahydrodicyclopentadiene and isomers thereof and pentaerythritol tetrapropoxyacrylate, (iv) at least one initiator, an initiator system, as well as optionally at least one stabiliser, and optionally at least one pigment, in particular the at least one pigment comprising titanium dioxide.

The amounts of the afore-mentioned components may assign the afore- and below mentioned contents in the total composition of 100% by weight.

In an embodiment variant, it is preferred for the polymerisable composition to be photochemically polymerisable, respectively. Alternatively, it is preferred for the polymerisable composition to be thermally polymerisable. Particularly preferably, the composition is photochemically as well as thermally polymerisable, in particular dually polymerisable. A photochemically polymerisable composition is understood to mean a composition polymerisable by means of a UV and/or Vis radiation source having emission maxima in the spectral region of 360 nm to 530 nm, preferably having a maximum or maxima in the spectral region of 400 to 500 nm. Particularly preferably, irradiation of the composition is carried out by means of pulsed UV- and/or Vis radiation source, in particular for greater than or equal to 50 milliseconds, preferably greater than or equal to 10 seconds, in particular per projection surface of the radiation source. Further preferred is an irradiation for greater than or equal to 15 seconds to 5 minutes, preferably for 10 to 30 seconds per projection surface of the radiation source. Suitable radiation sources generally include all usual radiation sources having an emission wave length, preferably emission maxima, in the spectral range of 400 to 480 nm and an intensity of greater than 500 mW/cm². The pulsed irradiation may amount to less than 1 second per radiation pulse if very thin layers are applied. A radiation source having an LED lamp is particularly preferred.

A thermally polymerisable composition is presently understood to mean a composition that may be polymerised at greater than or equal to 60 to 150° C., preferably at greater than or equal to 70 to 150° C., particularly preferably from 90 to 150° C. In this context, according to the invention it is further preferred for the volume shrinkage to be low.

Also a subject matter of the invention is a dental composite material obtainable by polymerisation i) using a UV/Vis radiation source, preferably using a Vis radiation source having emission maximal in the spectral region of 380 nm to 530 nm, preferably having at least one maximum or maxima in the spectral range of 400 to 500 nm, and optionally ii) at a pressure of 50 to 300 MPa and/or elevated temperature, preferably at 90 to 150° C., or i) using a UV and/or Vis radiation source, preferably using a Vis radiation source having emission maxima in the spectral range of 380 to 530 nm, preferably having at least one maximum or maxima in the spectral range of 400 to 500 nm, and/or ii) at a pressure of 50 to 300 MPa and/or elevated temperature, preferably at 90 to 150° C.

The following glasses are preferably considered: aluminium silicate glasses or fluoroaluminium silicate glasses, fluoroaluminium silicate glasses having a boron content, barium aluminum silicate, strontium silicate, strontium borosilicate, calcium silicate, calcium borosilicate, natrium silicate glass, potassium silicate glass, lithium silicate and/or lithium aluminum silicate as well as mixtures of at least two of the aforementioned glasses. Amorphous spherical fillers based on oxide or mixed oxide, such as amorphous $SiO_2$, $ZrO_2$ or mixed oxides of $SiO_2$ and $ZrO_2$, may be used as metal oxide or as a mixture of amorphous metal oxides. Alternatively, mixed oxides of zirconium dioxide and silicon dioxide, zirconium dioxide or zinc oxide as well as crystalline silicates may also be used as filler component in the composition.

A subject matter of the invention is also a composition that comprises a filler component selected from filler components functionalised with methacrylate groups, that are in particular selected from silicate, such as quartz and/or feldspar, metal oxide, mixed oxide, silicon dioxide, zirconium dioxide and/or zinc oxide, optionally a glass, or mixtures of the components,
  a) of an average particle size $d_{50}$ of 1.8 µm with plus/minus 0.25 µm and preferably $d_{99}$ less than or equal to 20 µm, or
  b) of a mixture of the afore-mentioned components of different fractions having average particle sizes with i) $d_{50}$ of 2 to 8 µm optionally with plus/minus 0.5 µm, in particular with 4 to 6 µm optionally with plus/minus 0.25 µm, ii) $d_{50}$ of 1.0 to 2.0 µm optionally with plus/minus 0.25 µm, in particular with 1.2 to 2.0 µm optionally with plus/minus 0.5 µm, preferably with 1.5 µm optionally with plus/minus 0.15 µm, and iii) $d_{50}$ of 0.5 µm to 1.2 µm optionally with plus/minus 0.15 µm, 0.7 to 0.9 µm optionally with plus/minus 0.5 µm, wherein the fractions of i) to ii) to iii) are present in the ratio of 1 to 4:1:4 to 8, in particular of 2 to 3:1:6 to 7. Particularly preferred is i) $d_{50}$ of 5 µm optionally with plus/minus 0.5 µm, ii) $d_{50}$ of 1.8 µm optionally with plus/minus 0.25 µm and iii) $d_{50}$ of 0.85 µm optionally with plus/minus 0.15 µm, wherein the fraction of i) to ii) to iii) are present in the ratio of 1 to 4:1:4 to 8, in particular of 2 to 3:1:6 to 7.

According to a preferred embodiment, the filler component is selected from filler components functionalised with methacrylate groups, that are in particular selected from silicate, such as quartz and/or feldspar, metal oxide, mixed oxide, silicon dioxide, zirconium dioxide and/or zinc oxide, optionally a glass, or mixtures of the components, of an average particle size $d_{50}$ of 0.7 to 2.0 µm, in particular 1.2 to 2.0 µm, preferably having an average particle size of 1.35 to 1.95 µm, in particular with $d_{50}$ of 1.8 µm optionally plus/minus 0.15 µm, and preferably with dog less than or equal to 10 µm. Particularly preferably, the at least one filler component is selected from filler components functionalised with methacrylate groups, that are in particular selected from silicate, such as quartz and/or feldspar, metal oxide, mixed oxide, silicon dioxide, zirconium dioxide and/or zinc oxide, optionally a glass, or mixtures of the components of an average particle size of $d_{50}$ of about 0.85 µm optionally plus/minus 0.1 µm, in particular plus/minus 0.05 µm, preferably plus/minus 0.03 µm, and preferably with $d_{99}$ less than or equal to 10 µm. A particularly preferred particle size distribution may be in the range of $d_{10}$ with greater than or equal to 0.2 µm to dog less than or equal to 20 µm, preferably less than or equal to 7.5 µm, preferably with $d_{10}$ greater than or equal to 0.4 µm to dog less than or equal to 7.5 µm and an average diameter $d_{50}$ of 0.7 to 7.5 µm.

According to a preferred embodiment, the composition comprises (i) 70 to 85% by weight or 5 to 35% by weight at least one inorganic filler component selected from filler components functionalised with methacrylate groups, that are in particular selected from silicate, such as quartz and/or feldspar, metal oxide, mixed oxide, silicon dioxide, zirconium dioxide and/or zinc oxide, optionally a glass, or mixtures of the components having an average particle size $d_{50}$ of 0.7 to 2.0 µm is present of greater than or equal to 50 to 80% by weight, based on the composition with a total composition of 100% by weight, in particular of greater than or equal to 55 to 76% by weight, preferably greater than or equal to 60 to 75% by weight, particularly preferably greater than or equal to 60 to 71% by weight in the total composition of 100% by weight.

Each further preferably in combination with an amorphous silicon dioxide with 4 to 7.5% by weight in the total composition. Preferably, the amorphous metal oxide is a non-agglomerated amorphous metal oxide of a primary particle size of 2 to 150 nm, in particular of 2 to 100 nm, preferably of 2 to 45 nm, the amorphous metal oxide comprising silicon dioxide, precipitated silicon dioxide, pyrogenic silica, zirconium oxide, mixed oxides or mixtures thereof, in particular the metal oxides are silanised.

In a preferred alternative, the composition may comprise an amount of polymeric particulate fillers in addition to the inorganic filler component. The total amount of such polymeric particulate filler may amount to 0.01 to 15% by weight, preferably from 0.5 to 10% by weight, in the total composition of the composition of 100% by weight. The particle size of the polymeric filler preferably is in the range of 10 to 200 micrometers, in particular of 30 to 90 micrometers, particularly preferably 20 to 50 micrometers.

According to a particularly preferable embodiment variant, the composition comprises as component (ii) a mixture of at least three different urethane acrylates and/or urethane alkyl acrylates, in particular of di- to deca-functional urethane acrylates and/or corresponding urethane alkyl acrylates, preferably from 15 to 19% by weight of at least one di-functional urethane acrylate and/or urethane alkyl acrylate comprising a urethane of the idealised formula I

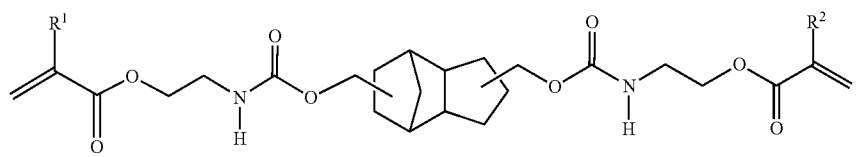

and/or a mixture of said urethanes of formula I as well as of the isomers, in particular mixture

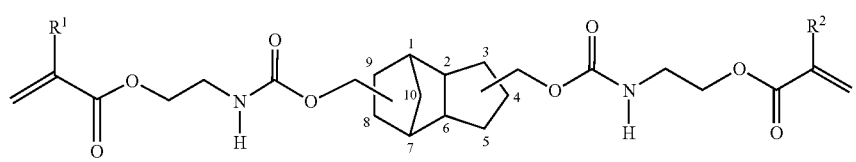

of the 3,8-/3,9-/4,8-/3, 10-/4,10-isomers of formula Ia and/or of the cis- and trans isomers of the afore-mentioned compounds, with R¹ and R² each independently selected from H and alkyl with 1 to 8 C atoms, and 5 to 6% by weight of a di-functional urethane acrylate having a bivalent alicyclic group with alkyl 1 to 10 C atoms and alkylene 3 to 20 C atoms, and optionally 0.1 to 2% by weight of at least one hexa-functional urethane acrylate and/or hexa-functional urethane methacrylate or dendritic urethane methacrylate, respectively, and (iii) at least one di-, tri-, tetra- or multi-functional monomer not being a urethane acrylate and not being a urethane alkyl acrylate, in particular at least one di-, tri-, tetra- or multi-functional methacrylic ester of polyethers, preferably dimethacrylate triethylene glycol, dimethacrylate tetraethylene glycol, 2,2-bis-[4-(2-hydroxy-3-methacryloyloxy-propoxy)phenyl] propane, pentaerythritol tetrapropoxyacrylate and/or bis-(2'-oxa-3'-oxo-pentyl-4'-ene) tetrahydro-dicyclopentadiene and isomers thereof, and (iv) at least one initiator or initiator system, preferably a) at least one photoinitiator for the UV and/or Vis spectral region or a photoinitiator system for the UV and/or Vis spectral region, and optionally at least one stabiliser, and/or b) at least one thermal initiator or a thermal initiator system, as well as c) optionally at least one stabiliser, and iv) optionally at least one pigment. Preferably according to the above-mentioned contents in the total composition.

The di- to deca-functional urethane acrylates or di- to deca-functional urethane alkyl acrylates are used as monomers and do not comprise peroxy groups.

According to a particularly preferred embodiment variant, the composition comprises (ii) 5 to 99.98% by weight, in particular 5 to 85% by weight, of a mixture of at least three different urethane acrylates and/or urethane alkyl acrylates, preferably of at least three different urethanes, the mixture comprising at least one di-functional urethane acrylate and/or urethane alkyl acrylate composition comprising a urethane of the idealised formula I, see also formula Ia, and/or mixture of said urethanes of formula I, as well as optionally mixtures of the 3,8-/3,9-/4,8-/3,10-/4,10-isomers and/or of the cis- and trans-isomers of the afore-mentioned compounds, with R¹ and R² each independently selected form H and alkyl with 1 to 8 C atoms, preferably H or methyl, and a di-functional urethane acrylate having a bivalent alkylene group and/or urethane alkyl acrylate having a bivalent alkylene group with alkyl from 1 to 10 C atoms, preferably with alkyl equal to methyl, and alkylene with 3 to 20 C atoms, preferably of three different urethane (alkyl) acrylates, as well as optionally at least one at least tetrafunctional dendritic urethane (alkyl) acrylate, preferably at least one hexa-functional dendritic urethane (alkyl) acrylate, in particular urethane (meth)acrylate.

According to a particularly preferred embodiment variant, the composition comprises (ii) 5 to 99.98% by weight of a mixture of at least two different urethanes selected from a mixture comprising at least one di-functional urethane acrylate and/or urethane alkyl acrylate comprising a urethane of the idealised formula I and/or mixtures of said urethanes of formula I, as well as optionally mixtures of the 3,8-/3,9-/4, 8-/3,10-/4,10-isomers and/or of the cis- and trans-isomers of the afore-mentioned compounds, with R¹ and R² each independently selected from H and alkyl with 1 to 8 C atoms, such as bis-(2',7'-dioxa-3',8'-dioxo-4'-aza-decyl-9'-ene) tetrahydrodicyclopentadiene, bis-(2',7'-dioxa-3',8'-dioxo-4'-aza-9'-methyl-decyl-9'-ene) tetrahydrodicyclopentadiene, and optionally at least one di-functional urethane acrylate having a bivalent alicyclic group and/or urethane (meth)acrylate having a bivalent alicyclic group that is selected from bis-(4',7'-dioxa-3',8'-dioxo-2'-aza-decyl-9'-en) tetrahydrodicyclopentadiene, bis-(4',7'-dioxa-3',8'-dioxo-2'-aza-9'-methyl-decyl-9'-ene) tetra-hydrodicyclopentadiene and/or mixtures thereof, as well as optionally of the 3,8-/3,9-/4,8-/3,10-/4,10-isomers and/or of the cis- and trans-isomers of the afore-mentioned compounds, and at least one further di-functional urethane (meth)acrylate, in particular at least one di-functional urethane acrylate having a bivalent alicyclic group and/or urethane methacrylate having a bivalent alicyclic group, as well as optionally at least one at least tetra-functional dendritic urethane acrylate and/or corresponding urethane methacrylate, preferably at least one hexa-functional dendritic urethane acrylate and/or urethane methacrylate. Particularly preferred are at least three different urethane (meth)acrylates selected from urethane acrylates and urethane methacrylates (based on the total composition of 100% by weigh).

The term (alkyl) acrylate or (meth)acrylate or urethane (alkyl) acrylate with (alkyl) in brackets or urethane (meth) acrylate with (meth) in brackets means that the term may comprise acrylates or urethane acrylates with or without alkyl groups or methyl groups. The alkyl groups preferably comprise 1 to 10 C atoms, preferably 1 to 2 C atoms in the said urethane alkyl acrylates. The alkyl groups preferably comprise 1 to 10 C atoms, preferably 1 to 2 C atoms in the said (alkyl) acrylates.

According to a particularly preferred embodiment variant, the composition comprises ii) 5 to 99.98% by weight, in particular 61 to 99.98% by weight, alternatively 5 to less than 10% by weight, each of a mixture of at least two different urethane (alkyl) acrylates, preferably of at least three different urethane (meth)acrylates, comprising at least a di-functional urethane acylate and/or a di-functional urethane methacrylate of the general formula I and at least one di-functional urethane acrylate and/or di-functional urethane methacrylate having a bivalent alkylene group, as well as optionally at least one at least tetra-functional dendritic urethane acrylate and/or tetra-functional dendritic urethane methacrylate, preferably at least one hexa-functional dendritic urethane acrylate and/or urethane methacrylate, the components (i) 0% by weight to 38.98% by weight, alternatively 94.98% by weight to 89.98% by weight, (iii) 0.01 to 10% by weight and (iv) 0.01 to 10% by weight, being adapted according to the disclosure, and the total composition amounting to 100% by weight.

According to the invention, the urethane acrylate having a bivalent alicyclic group is selected from urethanes of the idealised formula I and/or mixtures of said urethanes of formula I, as well as optionally mixtures of the 3,8-/3,9-/4, 8-/3, 10-/4,10-isomers and/or of the cis- and trans-isomers of the afore-mentioned compounds, with $R^1$ and $R^2$ each independently selected from H and alkyl with 1 to 8 C atoms, such as preferably bis-(2',7'-dioxa-3',8'-dioxo-4'-aza-decyl-9'-ene) tetrahydro-dicyclopentadiene, bis-(2',7'-dioxa-3',8'-dioxo-4'-aza-9'-methyl-decyl-9'-ene) tetrahydro-dicyclopentadiene, particularly preferably bis-(2',7'-dioxa-3',8'-dioxo-4'-aza-decyl-9'-ene) tetrahydrodicyclopentadiene. The urethane of formula I is obtainable by a reaction of the corresponding tetrahydrodicyclopentadiene substituted twice with hydroxymethylene groups with the corresponding isocyanate of an acrylic derivative, such as 2-isocyanatoethyl methacrylate.

The di-functional urethane (alkyl) acrylate, urethane (alkyl) acrylate having a bivalent alkylene group or urethane (meth)acrylate having a bivalent alicyclic group is preferably selected from linear or branched urethane dimethacrylates being functionalised with a bivalent alkylene group, urethane dimethacrylate-functionalised polyethers having alkylene group(s), such as bis(methacryloxy-2-ethoxycarbonyl amino)alkylene, bis(methacryloxy-2-ethoxycarbonyl amino)-substituted polyalkylene ethers, preferably 1,6-bis (methacryloxy-2-ethoxycarbonyl amino)-2,4,4-trimethyl hexane, UDMA with alternative name HEMA-TDMI. A bis(methacryloxy-2-ethoxycarbonyl amino)alkylene, wherein alkylene comprises linear or branched C3 to C20, preferably C3 to C6, is preferred, such as, particularly preferably, an alkylene substituted with methyl groups, such as HEMA-TMDI. The bivalent alkylene preferably comprises 2,2,4-trimethyl hexamethylene and/or 2,4,4-trimethyl hexamethylene.

The at least tetra-functional dendritic urethane methacrylate comprises tetra- to deca-functional dendritic urethane methacrylates.

Preferably, the composition comprises as component (i) 5 to 65% by weight, in particular from 40 to 70% by weight, alternative 5 to less than 10% by weight bis-(2',7'-dioxa-3', 8'-dioxo-4'-aza-decyl-9'-ene) tetrahydrodicyclopentadiene, bis-(2',7'-dioxa-3',8'-dioxo-4'-aza-9'-methyl-decyl-9'-ene) tetrahydrodicyclopentadiene and/or mixtures thereof as well as optionally mixtures of the 3,8-/3,9-/4,8-/3,10-/4,10-isomers and/or of the cis- and trans-isomers of the afore-mentioned compounds, and 1 to 15% by weight, in particular 5 to 6% by weight UDMA (1,6-bis(methacryloxy-2-ethoxycarbonyl amino)-2,4,4-trimethyl hexane), or HEMA-TMDI, and optionally 0.1 to 5% by weight, preferably 0.2 to 2% by weight, particularly preferably 0.1 to 1% by weight of at least one tetra- to deca-functional dendritic urethane methacrylate, based on the total composition.

According to a further preferred embodiment, the composition comprises as component (iii) 0.01 to 5% by weight of at least one di-, tri-, tetra- or multi-functional monomer not being a urethane (alkyl) acrylate and being selected from dimethacrylic esters of polyethers, bis-(2'-oxa-3'-oxo-pentyl-4'-ene) tetrahydrodicyclopentadiene and isomers thereof, and tri-, tetra- or multi-functional methacrylic esters of polyethers.

Preferably, the content of components (iii) amounts to 0.15 to 15% by weight, in particular 0.15 to 5% by weight, particularly preferably 1.0 to 2% by weight, component (iii) being selected from dimethacrylic esters of a polyethers, such as preferably dimethacrylate polyethylene glycol, dimethacrylate polypropylene glycol. Dimethacrylate triethylene glycol (TEGDMA), diethylene glycol dimethacrylate (DEGMA) and dimethacrylate tetraethylene glycol (TEDMA) are particularly preferred Water as stabiliser may be added to the composition to improve the consistency and the flow properties for the process-engineering processability. Stabilisers are preferably added to the composition to prevent premature polymerisation and give the material a certain shelf life. The composition comprises as preferred stabilisers in component (iv) at least one stabiliser selected from water, at least one benzophenone derivative, preferably alkoxy-substituted benzophenone and/or phenol derivative, such as 2-hydroxy-4-methoxybenzophenone, 2,6-bis(1,1-dimethyl)-4-methylphenol, or a mixture of the three stabilisers. The stabilisers are preferably present in 0.01 to 10% by weight in the total composition, particularly preferably from 0.7 to 10% by weight, in particular from 0.5 to 2% by weight. In addition, it is preferred for the composition to contain 0.01 to 2% by weight water as stabiliser, preferably 0.1 to 1.0% by weight water.

At least one pigment comprising at least one fluorescence pigment and optionally at least one organic colour pigment and/or at least one inorganic colour pigment, such as titanium dioxide, in particular non-fluorescent colour pigments, may be added for optimal adjustment of the colour and the aesthetic of the polymerised composition. The at least one fluorescence pigment preferably is an organic fluorescence pigment, in particular a non-polymerisable organic fluorescence pigment, where appropriate comprising aryl carboxylic acid esters, aryl carboxylic acids, coumarin, rhodamine, naphthalene imide or a derivative of the respective substance. Inorganic fluorescence pigments may comprise $CaAl_4O_7:Mn^{2+}$, $(Ba0.98Eu0.02)MgAl_{10}O_{17}$, $BaMgF_4:Eu^{2+}$, $Y(1.995)Ce(0.005)SiO_5$.

The composition may comprise as pigments, in particular colour pigments, organic pigments as well as inorganic pigments, in particular comprising diethyl 2,5-dihydroxyterephthalate, N,N'-Bis(3,5-xylyl) perylene 3,4:9,10-bis(dicarbimide), copper phthalocyanine, titanate pigment, in particular chromium antimony titanate (rutile structure), spinel black, in particular pigments being based on iron oxide black ($Fe_3O_4$), wherein iron (Fe) is partially substituted by chromium and copper or nickel and chromium or manganese, zinc iron chromium spinel, brown spinel, $((Zn,Fe)(Fe,Cr)_2O_4)$, cobalt zinc aluminate blue spinel and/or titanium oxide. The pigments comprising fluorescence pigments and colour pigments are preferably present in 0.01 to 10% by weight in the total composition, particularly preferably from 0.01 to 5% by weight, preferably from 0.01 to 1% by weight.

According to a further preferred embodiment, the composition may comprise:
(iv) 0.01 to 2% by weight photoinitiator for the UV and/or Vis spectral region or a photoinitiator system for the UV and/or Vis spectral region, and 0.01 to 2% by weight stabiliser.

Another subject matter of the invention is a polymerised composition obtainable by polymerisation of the composition according to the invention, in particular polymerisation by means of UV and/or Vis radiation, preferably by means of Vis radiation, particularly preferably by means of a radiation source that has emission maxima in the spectral range of 400 nm to 530 nm.

According to a particularly preferred embodiment, a subject matter of the invention is a polymerised composition comprising 0 to 90% by weight of at least one inorganic filler component of an average particle size $d_{50}$ in the range of 0.2 to 10 µm, preferably 0.5 to 3.5 µm, and preferably $d_{99}$ less than or equal to 20 µm, preferably less than 7.5 µm, as well as optionally at least one amorphous silanised metal oxide, in particular precipitated silicon dioxide and/or pyrogenic silica of a primary particle size of 2 to 150 nm, preferably of 2 to 100 nm, particularly preferably of 2 to 45 nm, 5.01 to 99.98% by weight of at least one polymer, in particular co-polymer, being based on a polymerised mixture comprising at least one bis-urethane of formula I and at least one diurethane di(meth)acrylate having a bivalent alkylene group, at least one tetra- to deca-functional dendritic urethane methacrylate, and at least one di-, tri-, tetra- or multi-functional methacrylic ester of polyethers, preferably dimethacrylate triethylene glycol, and 0.01 to 25% by weight of at least one pigment, in particular of at least one fluorescence pigment and of at least one organic colour pigment and/or of at least one inorganic colour pigment, the colour pigments preferably not being fluorescent, the total composition of the composition amounting to 100% by weight.

Furthermore, the polymerised composition may be used for producing technological components, that are in particular exposed to high mechanical loads, such as plastic templates, nails, screws, as well as further components familiar to the person skilled in the art etc.

The following are also preferably considered to be urethane (meth)acrylates according to the invention: (ii) at least one urethane (meth)acrylate, in particular a urethane dimethacrylate, preferably a bis(methacryloxy-2-ethoxycarbonyl amino) alkylene, diurethane acrylate oligomers, alkyl-functional urethane dimethacrylate oligomers, aromatic-functionalised urethane dimethacrylate oligomers, aliphatic unsaturated urethane acrylates, bis(methacryloxy-2-ethoxycarbonyl amino)-substituted polyethers, aromatic urethane diacrylate oligomers, aliphatic urethane diacrylate oligomers, aliphatic urethane diacrylates, hexa-functional aliphatic urethane resins, aliphatic urethane triacrylates, aliphatic urethane acrylate oligomers, unsaturated aliphatic urethane acrylates. Di-functional and multi-function urethane (meth)acrylates are preferred, such as, in particular, urethane di(meth)acrylate, the at least one (iii) urethane dimethacrylate is particularly preferably selected from linear or branched alkyl-functionalised urethane dimethacrylates, urethane dimethacrylate-functionalised polyethers, in particular bis(methacryloxy-2-ethoxycarbonyl amino)alkylene, bis(methacryloxy-2-ethoxycarbonyl amino)-substituted polyethers, preferably 1,6-bis(methacryloxy-2-ethoxycarbonyl amino)-2,4,4-trimethyl hexane. Suitable urethane (meth)acrylates are available under the following brand names: Ebecryl 230 (aliphatic urethane diacrylate), Actilane 9290, Craynor 9200 (diurethane acrylate oligomer), Ebecryl 210 (aromatic urethane diacrylate oligomers), Ebecryl 270 (aliphatic urethane diacrylate oligomers), Actilane 165, Actilane 250, Genomer 1122 (mono-functional urethane acrylate), Photomer 6210 (cas no. 52404-33-8, aliphatic urethane diacrylate), Photomer 6623 (hexa-functional aliphatic urethane resin), Photomer 6891 (aliphatic urethane triacrylate), UDMA, Roskydal LS 2258 (aliphatic urethane acrylate oligomer), Roskydal XP 2513 (unsaturated aliphatic urethane acrylate). The urethane (meth)acrylates may preferably be selected from the afore-mentioned urethane (meth)acrylates or from a mixture of at least two different, preferably at least three different, afore-mentioned urethane (meth)acrylates.

The at least one di-, tri-, tetra- or multi-functional monomer not being a urethane (alkyl) acrylate, in particular not being a urethane (meth)acrylate, is preferably selected from at least one of the following monomers, in particular a mixture of monomers comprising bis-(2'-oxa-3'-oxo-pentyl-4'-ene) tetrahydrodicyclopentadiene and isomers thereof, 1,4-butanediol dimethacrylate (1,4-BDMA) or pentaerythritol tetraacrylate, bis-GMA monomer (bisphenol A glycidyl methacrylate), triethylene glycol dimethacrylate (TEGDMA) and diethylene glycol dimethacrylate (DE-GMA), tetraethylene glycol di(meth)acrylate, decanediol di(meth)acrylate, dodecanediol di(meth)acrylate, hexyldecanediol di(meth)acrylate, trimethylol propane tri(meth)acrylate, pentaerythritol tetra(meth)acrylate as well as butanediol di(meth)acrylate, ethylene glycol polyethylene di(meth)acrylate, glycol di(meth)acrylate, ethoxylated/propoxylated bisphenol A di(meth)acrylates, a mixture comprising at least one of these (meth)acrylates and/or copolymers comprising one or at least two of the aforementioned monomers.

Typical di-functional monomers, also referred to as crosslinker and/or multi-crosslinker, include tri- or tetraethylene glycol di(meth)acrylate, BDMA, 1,4-butanediol dimethacrylate (1,4-BDMA), bis-GMA monomer (bisphenol A glycidyl methacrylate, an addition product of methacrylic acid and bisphenol A diglycidyl ether), diethylene glycol di(meth)acrylate, bisphenol A di(meth)acrylate, decanediol di(meth)acrylate, dodecanediol di(meth)acrylate, hexyldecanediol di(meth)acrylate as well as butanediol di(meth)acrylate, ethylene glycol di(meth)acrylate, polyethylene glycol di(meth)acrylate, ethoxylated/propoxylated bisphenol A di(meth)acrylate. The following di-functional monomers may also be added as diluting agent (low viscosity acrylates). Tri- and tetra-functional monomers and/or multicrosslinkers comprising trimethylol propane tri(meth)acrylate, tris(2-hydroxyethyl) isocyanurate triacrylate, pentaerythritol tetraacrylate.

At least one of the following monomers may be present in the composition in addition to the di-, tri- or multi-functional monomer or monomers, comprising at least one monomer, in particular a mixture of monomers of methyl methacrylate, ethyl methacrylate, propyl methacrylate, butyl methacrylate, n-hexyl methacrylate, 2-phenoxyethyl methacrylate, isobornyl methacrylate, isodecyl methacrylate, polypropylene glycol monomethacrylate, tetrahydrofuryl methacrylate, methyl acrylate, ethyl acrylate, propyl acrylate, butyl acrylate, n-hexyl acrylate, 2-phenoxyethyl acrylate, isobornyl acrylate, isodecyl acrylate, tetrahydrofuryl acrylate, hydroxyethyl acrylate, hydroxypropyl acrylate, hydroxyethyl methacrylate, hydroxypropyl methacrylate, benzyl-, furfuryl- or phenyl (meth)acrylate, a mixture containing at least one of these (meth)acrylates and/or copolymers comprising one or at least two of the aforementioned monomers.

Furthermore, a subject matter of the invention is a composition comprising, preferably additionally, at least one or more substance(s) from the groups consisting of fillers, pigments, stabilisers, regulators, antimicrobial additives, UV-absorbing agents, thixotroping agents, catalysts and crosslinkers. Rather small amounts of said additives—as also of pigments, stabilisers and regulators—are used, e.g. a total of 0.01 to 3.0, in particular 0.01 to 1.0% by weight, based on the total composition of the composition. Suitable stabilizers include e.g. hydroquinone monomethyl ether or 2,6-di-tert.-butyl 4-methyl phenol (BHT).

Preferably, the composition comprises as component (iv) 0.01 to 10% by weight, in particular from 0.5 to 5% by weight, preferably 0.5 to 2% by weight, of at least one initiator or initiator system, preferably i) at least one photoinitiator for the UV and/or Vis spectral region or a photoinitiator system for the UV and/or Vis spectral region, and optionally at least one stabiliser, and optionally further usual additives, optionally pigment(s) or dye(s).

Particularly preferred photoinitators comprise alpha-hydroxyphenyl ketone, benzildimethyl ketal or 2,4,6-trimethyl benzoyl diphenyl phosphine oxide, phenyl bis(2,4,6-trimethyl benzoyl) phosphine oxide, 2,4,6-trimethyl benzoyl phenyl phosphinic acid ethyl ester, and mixtures of at least two of the photoinitiators, bisacyl phosphine oxide (BAPO). Or also camphorquinone with amines selected from N, N-dimethyl p-toluidine, N—N-dihydroxyethyl p-toluidine and p-dimethyl aminobenzoic acid diethyl ester.

Typical stabilisers comprise 2,6-di-tert.-butyl 4-methyl phenol (BHT) or hydroquinone monomethyl ether (MEHQ), 2-hydroxy-4-methoxybenzophenone, HALS (Hindered Amine Light Stabilisers), benzotriazole ultraviolet absorbers (UVAs) and hydroxy phenyl triazines (HPT). Particularly suitable stabilisers are e.g. hydroquinone monomethyl ether or 2,6-di-tert.-butyl 4-methyl phenol (BHT).

Peroxides, hydroxyl peroxides, optionally azo compounds, or mixtures comprising them are suitable as initiators, in particular thermal initiators or initiator systems. Suitable thermal initiators may be used as radical initiators in the temperature range of 70 to 150° C., preferably of 90 to 150° C. Preferred thermal initiators comprise at least one initiator selected from: dilauroyl peroxide, di-tert.-butyl peroxide, tert.-butyl peroxy-2-ethyl hexanoate, dibenzoyl peroxide, dicumyl peroxide, dicumyl hydroperoxide, 2,2'-azobisisobutyronitrile, benzyl barbituric acid derivative, particularly preferably tert.-butyl peroxy-2-ethyl hexanoate, dibenzoyl peroxide, dicumyl peroxide, dicumyl hydroperoxide, azobisisobutyronitrile, benzyl barbituric acid derivative, such as phenyl benzyl barbituric acid, cyclohexyl benzyl barbituric acid.

The following initiators and/or initiator systems for auto- or cold-polymerisation comprise a) at least one initiator, in particular at least one peroxide and/or azo compound, in particular LPO: dilauroyl peroxide, BPO: dibenzoyl peroxide, t-BPEH: tert.-butyl peroxy-2-ethyl hexanoate, AIBN: 2,2'-azobis-(isobutyronitrile), DTBP: di-tert.-butyl peroxide, and, optionally, b) at least one activator, in particular at least one aromatic amine, such as N,N-dimethyl p-toluidine, N,N-dihydroxyethyl p-toluidine and/or p-dimethyl aminobenzoic acid diethyl ester, or c) at least one initiator system selected from redox systems, in particular a combination selected from dibenzoyl peroxide, dilauroyl peroxide, and camphorquinone with amines selected from N, N-dimethyl p-toluidine, N, N-dihydroxyethyl p-toluidine, and p-dimethyl aminobenzoic acid diethyl ester. The initiator may alternatively be a redox system comprising a peroxide, and a reduction agent selected from ascorbic acid, ascorbic acid derivative, barbituric acid or a barbituric acid derivative, sulfinic acid, sulfinic acid derivative, particularly preferred is a redox system comprising (i) barbituric acid or thiobarbituric acid or a barbituric acid derivative or thiobarbituric acid derivative, and (ii) at least one copper salt or copper complex, and (iii) at least one compound having an ionic halogen atom, particularly preferred is a redox system comprising 1-benzyl 5-phenyl barbituric acid, copper acetyl acetonate, and benzyl dibutyl ammonium chloride. Particularly preferably, the polymerisation in the two-component prosthetic base material is started by a barbituric acid derivative.

In general, initiators for the polymerisation reaction of cold- or auto-polymerising starting mixtures are considered to be those with which radical polymerisation reactions may be started. Preferred initiators are peroxides as well as azo compounds, such as, for example, the following: LPO: dilauroyl peroxide, BPO: dibenzoyl peroxide, t-BPEH: tert.-butyl peroxi-2-ethyl hexanoate, AIBN: 2,2'-azobis-(isobutyronitrile), DTBP: di-tert.-butyl peroxide.

In order to accelerate the initiation of radical polymerisation by peroxides, suitable activators, e.g. aromatic amines, may be added. Examples of suitable amines are N,N-dimethyl p-toluidine, N,N-dihydroxyethyl p-toluidine and p-dibenzyl aminobenzoic acid diethyl ester. In this context, the amines regularly function as co-initiators and are usually present in an amount of up to 0.5% by weight.

The following exemplary embodiments are intended to illustrate the invention without limiting the invention to these examples.

EXEMPLARY EMBODIMENTS

Testing Methods for Determining the Fracture Toughness According to ISO-13586:2000

Test specimens (CT specimens) according to ASTM E 1820-13 and ISO 13586:2000, with alternative ratios for W/B $2 \leq W/B \leq 4$.

The fracture toughness of the composition to be measured is determined on test specimens (CT specimens) having the following dimensions W (according to ASTM 1820-13) and w (according to ISO 13586)=10 mm, B (according to ASTM 1820-13) und h (according to ISO 13586:2000)=5 mm, using the ratio or the proportions of the dimensions of the test specimens according to the specifications of ASTM E 1820-13 and ISO 13586.

At first, test specimens (cuboids) having a thickness of 5 mm and a base area/deck area of 12.0×12.5 mm are produced. Light curing or photo-polymerisation, respectively, was carried out by means of irradiation (h·v) with blue light, wherein a total of five spots (projection surfaces) were irradiated for 20 seconds respectively (Translux 2 Wave, KULZER GmbH).

A notch (approx. 0.55w) centrally and perpendicularly aligned to a longitudinal edge is made using a 1 mm rotating cutting tool. Holes perpendicularly made in the base/deck area are drilled to receive pins my means of a cutting tool having a diameter of 2 mm that are arranged at the same position as provided for the specimens of (ASTM 1820-13 and ISO 13583:2000).

A cut is made in the top of the centrally located notch by means of a razor blade to create a crack having a diameter of less than ≤8 μm. The length of the crack ($a_i$) is measured by means of an optical microscope before the measurement is carried out. The changing crack length $a_i$ is measured under the impact of defined mechanical forces.

FIG. 1a: Cross section of the test specimen, FIG. 1b: Top view onto the test specimen. With legend of refence numerals and labellings and description of the measurement setup.

Legend
    w=distance between the center point of the two holes and the opposite test specimen edge;
    B=width of the entire test specimen; $I_1$=length; $I_2$=distance between the center point of the two holes being symmetrically arranged to the crack plane +/−0.005w;
    R=radius; h=thickness; a=crack length; P=force
    B=1.25w+/−0.01w; I1=1.2w+/−0.01w, I2=0.55w+/−0.0005w, R=0.125w+/−0.005w, 0.4w<h<0.6w; 0.45w≤a≤0.55w The pins and holes are intended to have a smooth surface and a loose fit to avoid friction.

$$K_{Ic} = [P/h \cdot W^{0.5}] f(a_i/W)$$

$$f(a_i/W) = \frac{\left\{\left(2 + \frac{a_i}{W}\right)\left[0.886 + 4.64\left(\frac{a_i}{W}\right) - 13.32\left(\frac{a_i}{W}\right)^2 + 14.72\left(\frac{a_i}{W}\right)^3 - 5.6\left(\frac{a_i}{W}\right)^4\right]\right\}}{\left(1 - \frac{a_i}{W}\right)^{3/2}}$$

Thereafter, the test specimens are fixed in a universal testing machine (Zwick/Roell) using metallic pins that are guided through the holes. Subsequently, a defined tensile force (P) is applied via the pins to the test specimen until break at a speed of 1 mm/min. The tensile force (P), the thickness (B) and the width (W) as well as the crack length $a_i$, the fracture toughness $K_{Ic}$ are calculated according to the following formula.

TABLE 1a compositions according to the invention

| | | Example F1 | Example F2 | Example F3 | Example F4 | Example F5 |
|---|---|---|---|---|---|---|
| inorganic fillers | average particle size $d_{50}$ | 0.85 μm | 1.5 μm | 2 μm | 0.85 μm | 0.85 μm |
| | ingredient | wt.-% | wt.-% | wt.-% | wt.-% | wt.-% |
| | auminium borosilicate glass (methacrylate-functionalised) | 74.00 | 74.00 | | 75.00 | |
| | quartz flour (methacrylate-functionalised) | | | | | 74.00 |
| | feldspar (methacrylate-functionalised) | | | 70.00 | | |
| metal oxide | amorphous $SiO_2$, here: Aerosil | 5.00 | 5.00 | 5.00 | 5.00 | 5.00 |
| urethane (meth-) acrylate | bis-(2',7'-dioxa-3',8'-dioxo-4'-aza-decyl-9'-ene) tetrahydrocyclopentadiene (TCDDIUEA) | 12.80 | 12.80 | 15.00 | 13.20 | 12.80 |
| | urethane methacrylate oligomer hexa-functional | 0.65 | 0.65 | 0.90 | | 0.65 |
| | 7,7,9-trimethyl 4,13-dioxo-3,14-dioxa-5,12-diaza-hexadecane 1,16-diyl bismethacrylate (UDMA) | 4.50 | 4.50 | 5.50 | 4.50 | 4.50 |
| di- to multi-functional monomers | 1,2-bis(2-(methacryloyloxy)ethoxy) ethane | 0.85 | 0.85 | 1.40 | 0.80 | 0.85 |
| initiator system | tert.-butyl peroxy-2-ethyl hexanoate | 0.50 | 0.50 | 0.50 | 0.50 | 0.50 |
| | 2,4,6-trimethyl benzoyl phenyl phosphinic acid ethyl ester TPO | 0.10 | 0.10 | 0.10 | 0.10 | 0.10 |
| stabiliser | 2-hydroxy-4-methoxy-benzophenone | 0.30 | 0.30 | 0.30 | 0.30 | 0.30 |
| | water | 0.60 | 0.60 | 0.60 | | 0.60 |
| pigments | organic/inorganic pigments (e.g. $TiO_2$) | 0.70 | 0.70 | 0.70 | 0.60 | 0.70 |
| | | 100.00% | 100.00% | 100.00% | 100.00% | 100.00% |

TABLE 1b compositions according to the invention

| | | Example F6 wt.-% | Example F7 wt.-% | Example F8 t.-% | Example F9 wt.-% |
|---|---|---|---|---|---|
| inorganic fillers | average particle size $d_{50}$ | 0.85 μm | 0.85 μm | 0.85 μm | 0.85 μm |
| | ingredient | | | | |
| | spherical glass particles (methacrylate-functionalised) | 74.00 | | | |
| | zirconium oxide silicon dioxide mixed oxide (methacrylate-functionalised) | | 74.00 | | |
| | zinc oxide silicon dioxide mixed oxide (methacrylate-functionalised) | | | 74.00 | |
| | zirconium oxide (methacrylate-functionalised) | | | | 74.00 |
| metal oxide | amorphous $SiO_2$, here: Aerosil | 5.00 | 5.00 | 5.00 | 5.00 |
| urethane (meth-)acrylate | bis-(2',7'-dioxa-3',8'-dioxo-4'-aza-decyl-9'-ene) tetrahydro-dicyclopentadiene, (TCDDIUEA) | 12.80 | 12.80 | 12.80 | 12.80 |
| | urethane methacrylate oligomer hexa-functional | 0.65 | 0.65 | 0.65 | 0.65 |
| | 7,7,9-trimethyl 4,13-dioxo-3,14-dioxa-5,12-diaza-hexadecane 1,16-diyl bismethacrylate (UDMA) | 4.50 | 4.50 | 4.50 | 4.50 |
| di- to multi-functional monomers | 1,2-bis(2-(methacryloyloxy)ethoxy) ethane | 0.85 | 0.85 | 0.85 | 0.85 |
| initiator system | tert.-butyl peroxy-2-ethyl hexanoate | 0.50 | 0.50 | 0.50 | 0.50 |
| | 2,4,6-trimethyl benzoyl phenyl phosphinic acid ethyl ester, TPO | 0.10 | 0.10 | 0.10 | 0.10 |
| stabiliser | 2-hydroxy-4-methoxy-benzophenone | 0.30 | 0.30 | 0.30 | 0.30 |
| | water | 0.65 | 0.60 | 0.60 | 0.60 |
| pigments | organic/inorganic pigments (e.g. $TiO_2$) | 0.70 | 0.70 | 0.70 | 0.70 |
| | | 100.00% | 100.00% | 100.00% | 100.00% |

TABLE 1c composition according to the invention Examples

| | | Example M1 wt.-% | Example M2 wt.-% | Example M3 wt.-% | Example M4 wt.-% | Example M5 wt.-% |
|---|---|---|---|---|---|---|
| inorganic fillers | average particle size $d_{50}$ | 0.85 μm | 0.85 μm | 0.85 μm | 0.85 μm | 0.85 μm |
| | ingredient | | | | | |
| | aluminium borosilicate glass | 74.00 | 74.00 | 74.00 | 74.00 | 74.00 |
| metal oxide | amorphous $SiO_2$ | 0.10 | 0.10 | 0.10 | 0.10 | 0.10 |
| urethane (meth-)acrylate | bis-(2',7'-dioxa-3',8'-di-oxo-4'-aza-decyl-9'-ene) tetra-hydrodicyclopentadiene | 12.0 | 12.80 | 12.80 | 12.80 | 12.80 |
| | urethane methacrylate oligomer hexa-functional | 0.65 | 0.65 | 0.65 | 0.65 | 0.65 |
| | 7,7,9-trimethyl 4,13-dioxo-3,14-dioxa-5,12-diaza-hexadecane 1,16-diyl bismethacrylate | 5.40 | 5.40 | 5.40 | 5.40 | 5.40 |

TABLE 1c-continued

| | composition according to the invention Examples | | | | | |
|---|---|---|---|---|---|---|
| | | Example M1 | Example M2 | Example M3 | Example M4 | Example M5 |
| di- to multi-functional monomers | 1,2-bis(2-(methacryloyloxy) ethoxy) ethane | 5.85 | | | | |
| | tricyclodecane dimethanol diacrylate | | 5.85 | | | |
| | 4 mol ethoxylated bisphenol A dimethacrylate erster | | | 5.85 | | |
| | 2,2-bis-[4-(2-hydroxy-3-methacryloyloxy-propoxy)phenyl] propane | | | | 5.85 | |
| | pentaerythritol tetrapropoxyacrylate | | | | | 5.85 |
| initiator system | tert.-butyl peroxy-2-ethyl hexanoate | 0.50 | 0.50 | 0.50 | 0.50 | 0.50 |
| | 2,4,6-trimethyl benzoyl phenyl phosphinic acid ethyl ester | 0.10 | 0.10 | 0.10 | 0.10 | 0.10 |
| stabiliser | 2-hydroxy-4-methoxy-benzophenone | 0.30 | 0.30 | 0.30 | 0.30 | 0.30 |
| pigments | organic/inorganic pigments (e.g. $TiO_2$) | 0.10 | 0.10 | 0.10 | 0.10 | 0.10 |
| | | 100.00% | 100.00% | 100.00% | 100.00% | 100.00% |

TABLE 1d

| | composition according to the invention Examples | | |
|---|---|---|---|
| | | Example L1 | Example L2 |
| inorganic fillers | ingredient | wt.-% | wt.-% |
| | aluminium borosilicate glass $d_{50}$ = 0.4 µm | 12.00 | 12.00 |
| | aluminium borosilicate glass $d_{50}$ = 1.5 µm | 36.40 | 36.40 |
| | ytterbium fluoride | 15.00 | 15.00 |
| metal oxide | amorphous $SiO_2$ | 1.00 | 1.00 |
| | pyrogenic $SiO_2$ | 7.88 | 7.88 |
| urethane (meth-)acrylate | bis-(2',7'-dioxa-3',8'-dioxo-4'-aza-decyl-9'-ene) tetrahydro-dicyclopentadiene | 18.85 | 15.08 |
| | 7,7,9-trimethyl 4,13-dioxo-3,14-dioxa-5,12-diaza-hexadecane 1,16-diyl bismethacrylate | 7.09 | 7.09 |
| di- to multi-functional monomers | 1,2-bis(2-(methacryloyloxy) ethoxy) ethane | | |
| | tricyclodecane dimethanol diacrylate | 0.55 | 0.55 |
| | 4 mol ethoxylated bisphenol A dimethacrylate ester | | 3.77 |
| | camphorquinone | 0.04 | 0.04 |
| | N,N-dimethyl aminobenzoic acid ester | 0.16 | 0.16 |
| stabliliser | 2-hydroxy-4-methoxy-benzophenone | 0.03 | 0.03 |
| | water | 0.50 | 0.50 |
| pigments | organic/inorganic pigments (e.g. $TiO_2$) | 0.50 | 0.50 |
| | | 100.00% | 100.00% |

TABLE 1e compositions according to the invention Examples

|  |  | Example L5 wt.-% | Example L6 wt.-% | Example L7 wt.-% |
|---|---|---|---|---|
| inorganic fillers | ingredient |  |  |  |
|  | aluminium borsilicate glass $d_{50}$ = 0.4 µm | 12.00 | 51.64 |  |
|  | aluminium borosilicate glass $d_{50}$ = 1.5 µm | 36.40 |  |  |
|  | ytterbium fluoride | 15.00 |  |  |
| metal oxide | amorphous $SiO_2$ | 1.00 |  |  |
|  | pyrogenic $SiO_2$ | 7.88 | 1.48 |  |
| urethane (meth-) acrylate | bis-(2',7'-dioxa-3',8'-dioxo-4'-aza-decyl-9'-ene) tetrahydro-dicyclopentadiene | 9.43 | 29.51 | 66.20 |
|  | 7,7,9-trimethyl 4,13-dioxo-3,14-dioxa-5,12-diaza-hexadecane 1,16-diyl bismethacrylate | 7.09 | 14.75 | 33.10 |
| di- to multi-functional monomers | 1,2-bis(2-(methacryoyloxy) ethoxy) ethane | 0.55 | 0.81 |  |
|  | 4 mol ethoxylated bisphenol A dimethacrylate ester | 9.42 |  |  |
|  | camphorquinone | 0.04 | 0.06 | 0.03 |
|  | N,N-dimethyl aminobenzoic acid ester | 0.16 | 0.24 | 0.30 |
| stabiliser | 2-hydroxy-4-methoxy-benzophenone | 0.03 | 0.04 | 0.03 |
|  | water | 0.50 | 0.74 |  |
| pigments | organic/inorganic pigments (e.g. $TiO_2$) | 0.50 | 0.74 | 0.33 |
|  |  | 100.00 | 100.00 | 100.00 |

TABLE 2 comparative example (VG) 3 as VG3a and VG3b in variation within the indicated ranges

|  |  | VG 3 |  |
|---|---|---|---|
| dental glass | average diameter $d_{50}$ = 0.85 µm, $d_{99}$ = <5 µm | 0.85 µm |  |
|  |  | wt.-% | g |
| dental glass | barium aluminium borofluo rsilicate glass (silanised) | 62-80 | 62-80 |
| metal oxide | amorphous $SiO_2$, $d_{50}$ = 5-10 nm | 6.2-8.1 | 6.2-8.1 |
|  | bis-GMA | 11.8-16.2 | 11.8-16.2 |
|  | dimethacrylate triethylene glycol | 5.4-7.4 | 5.4-7.4 |
|  | camphorquinone | 0.03 | 0.03 |
| di- to multi-functional monomers | N,N-dimethyl 4-aminobenzoic acid ester, such as 2-n-butoxaethyl ester | 0.04 | 0.04 |
| stabiliser | 2,6-bis(1,1-dimethyl ethyl) 4-methyl phenol | 0.03-0.12 | 0.03-0.12 |
| pigments |  | 0.1-0.2 | 0.1-0.2 |

Irradiation method of the surface of the test specimens with blue light (emission maximum approx. 440 to 460 nm) with 5 projection surfaces on the surface of the test specimen with respectively 1×20 seconds of the samples in Table 3. The thermally cured samples in Table 3 are previously irradiated with UV/Vis light on the surface 1×60 seconds per side and subsequently thermally cured (approx. 3 h at 95° C.).

TABLE 3

Results of the fracture toughness measurement

| Composition* | Irradiation method | | Irradiation method subsequent to thermal curing 3 h at 95° C. | |
|---|---|---|---|---|
| | $K_{IC}$ [MPa√m] | Stdev | $K_{IC}$ [MPa√m] | Stdev |
| VG3a | 0.7 | 0.2 | | |
| VG3b | 0.8 | 0.2 | | |
| VG3c | | | 1.0 | 0.2 |
| VG3d | | | 0.9 | 0.2 |
| F1 | | | 1.5 | 0.2 |
| F2 | | | 1.4 | 0.2 |
| F3 | | | 2.2 | 0.2 |
| F4 | | | 1.3 | 0.1 |
| F5 | | | 1.6 | 0.2 |
| F6 | | | 1.4 | 0.2 |
| M1 | | | 1.7 | 0.2 |
| M2 | | | 1.4 | 0.2 |
| M3 | | | 1.4 | 0.2 |
| M4 | | | 1.4 | 0.2 |
| M5 | | | 1.3 | 0.2 |
| L1 | | | 1.4 | 0.1 |
| L2 | | | 1.3 | 0.1 |

*Different polymerisation conditions of VG3a to VG3d

The results of the fracture toughness measurement on the test specimens only radiation polymerised of the comparative examples with bis-GMA as a component in the polymer matrix show quite low values for the fracture toughness (VG3a, VG3b).

Significantly better values of 1.3 via 1.7 to 2.2 MPa·m$^{1/2}$ for the fracture toughness are obtained with the composite materials according to the invention based on bis-(2',7'-dioxa-3',8'-dioxo-4'-aza-decyl-9'-ene) tetrahydrodicyclopentadiene as well as on its isomers in the polymer matrix.

The invention claimed is:

1. Polymerisable composition, comprising
   (i) 70 to 85% by weight of at least one inorganic filler component, comprising at least one glass, silicate, quartz, feldspar, metal oxide, mixed oxide, silicon dioxide, zirconium dioxide and/or zinc oxide having an average particle size of 0.4 μm to 10 μm, and optionally at least one amorphous metal oxide having an average primary particle size of 10 nm to 115 nm,
   (ii) 10 to 30% by weight comprising at least a mixture of at least three different urethane acrylates and/or urethane alkyl acrylates, the mixture comprising
   at least one urethane acrylate having a bivalent alicyclic group of the formula I

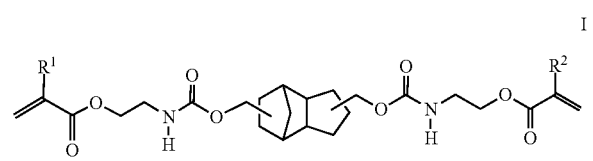

I and/or mixtures of said urethanes of formula I, as well as optionally mixtures of the isomers of the afore-mentioned compounds with R$^1$ and R$^2$ each independently selected from H and alkyl having 1 to 8 C-atoms,
   a di-functional urethane acrylate and/or urethane alkyl acrylate having a bivalent alkylene group, wherein the alkyl comprises 1 to 10 C-atoms, and
   at least one at least tetra-functional dendritic urethane acrylate and/or corresponding urethane alkyl acrylate, wherein the alkyl comprises 1 to 10 C-atoms,
   (iii) 0.01 to 5% by weight of at least one di-, tri-, tetra- or multi-functional monomer not being a urethane acrylate and/or not being a urethane alkyl acrylate,
   (iv) 0.01 to 10% by weight of at least one initiator, of an initiator system, as well as optionally of at least one stabiliser, and optionally of at least one pigment, based on the total composition of the polymerisable composition amounting to 100% by weight.

2. Composition according to claim 1, wherein the at least one inorganic filler component comprising at least one glass, silicate, feldspar, metal oxide, mixed oxide, silicon dioxide, zirconium dioxide has an average particle size d$_{50}$ of 0.5 to 10 μm.

3. Composition according to claim 1, wherein
   a) the at least one inorganic filler component comprises at least one glass, silicate, quartz, feldspar, metal oxide, mixed oxide, silicon dioxide, zirconium dioxide or a mixture comprising at least two of the components having an average particle size of d$_{50}$ of 1.8 μm, or
   b) the at least one inorganic filler component comprising at least one glass, feldspar, metal oxide, mixed oxide, silicon dioxide, zirconium dioxide or a mixture comprising at least two of the components is present as a mixture of different fraction having an average particle size, with i) d$_{50}$ of 2 to 8 μm, ii) d$_{50}$ of 1.0 to 2.0 μm, and iii) d$_{50}$ of 0.5 μm to 2 μm, the fractions of i) to ii) to iii) being present in a ratio of 1 to 4:1:4 to 8.

4. Composition according to claim 1, wherein the amorphous metal oxide comprises at least one one-agglomerated amorphous metal oxide having a primary particle size of 2 to 150 nm, and this amorphous metal oxide optionally comprises precipitated silicon dioxide, pyrogenic silica, zirconium oxide or mixed oxides.

5. Composition according to claim 1, wherein the composition comprises as (i) inorganic filler component
   (i.1) 70 to 84% by weight at least one glass, silicate, quartz, feldspar, metal oxide, mixed oxide, silicon dioxide, zirconium dioxide or a mixture comprising at least two of said filling components, and optionally
   (i.2) 0.05 to 5% by weight amorphous metal oxide, in particular pyrogenic silica and/or precipitated silicon dioxide,
   based on the total composition of the composition of 100% by weight.

6. Composition according to claim 1, wherein
   (ii) the mixture of at least three different urethane acrylates and/or urethane alkyl acrylates, comprises, as the at least one at least tetra-functional dendritic urethane acrylate and/or corresponding urethane alkyl acrylate, at least one hexa-functional dendritic urethane acrylate or corresponding urethane alkyl acrylate.

7. Composition according to claim 1, wherein
   (iii) is selected from di-methacrylic esters of polyethers, tri-, tetra- or multi-functional methacrylic ester of polyethers and 2,2-bis-[4-(2-hydroxy-3-methacryloyloxy-propoxy)phenyl] propane, bis-(2'-oxa-3'-oxo-pentyl-4'-ene) tetrahydrodicyclopentadiene and isomers thereof, and optionally pentaerythritol tetrapropoxyacrylate.

8. Composition according to claim 1, wherein the at least one stabiliser comprises water, at least one benzophenone derivative and/or phenol derivative.

9. Composition according to claim 1, wherein it comprises (v) 0.01 to 15% by weight of a polymeric particulate filler,
based on the total composition of the composition amounting to 100% by weight.

10. Polymerised composition obtainable by polymerising the composition according to claim 1, i) using a UV-radiation source and/or a Vis-radiation source having emission maxima in the spectral range of 380 nm to 530 nm, and/or ii) at a pressure of 50 to 300 MPa and/or elevated temperature.

11. Method comprising:
producing at least one three-dimensional article or block of material from the composition according to claim 1 in additive manufacturing, in generative manufacturing base on radiation, in a stereolithographic process, SLA process (laser-based stereolithographic process), a DLP process (Digital Light Processing), or in a SLA and DLP process, in generative manufacturing based on LED beamers, in generative manufacturing bases on radiation and thermally, in thermal generative manufacturing, in 3D printing processes, multijet manufacturing processes (MJM) and polyjet manufacturing processes.

12. Method comprising:
producing at least one three-dimensional article or block of material from the composition according to claim 10 in additive manufacturing, in generative manufacturing base on radiation, in a stereolithographic process, SLA process (laser-based stereolithographic process), a DLP process (Digital Light Processing), or in a SLA and DLP process, in generative manufacturing based on LED beamers, in generative manufacturing bases on radiation and thermally, in thermal generative manufacturing, in 3D printing processes, multijet manufacturing processes (MJM) and polyjet manufacturing processes.

* * * * *

UNITED STATES PATENT AND TRADEMARK OFFICE
CERTIFICATE OF CORRECTION

PATENT NO. : 12,365,811 B2
APPLICATION NO. : 17/773361
DATED : July 22, 2025
INVENTOR(S) : Andreas Utterodt et al.

It is certified that error appears in the above-identified patent and that said Letters Patent is hereby corrected as shown below:

In the Specification

Column 8, Line 21, "dog" should read -- $d_{99}$ --.

Column 8, Line 33, "dog" should read -- $d_{99}$ --.

Column 8, Line 35, "dog" should read -- $d_{99}$ --.

Column 18, Line 6, "11+1.2w+/-0.01w," should read -- $I_1$+1.2w+/-0.01w, --.

Column 18, Lines 6 and 7, "12=0.55w+/-0.0005w," should read -- $I_2$=0.55w+/-0.0005w, --.

Signed and Sealed this
Tenth Day of February, 2026

John A. Squires
*Director of the United States Patent and Trademark Office*